(12) United States Patent
Chae et al.

(10) Patent No.: US 10,623,050 B2
(45) Date of Patent: Apr. 14, 2020

(54) METHOD AND APPARATUS FOR TRANSMITTING AND RECEIVING SIGNALS USING OPEN-LOOP MULTI-INPUT/OUTPUT TECHNOLOGY

(71) Applicant: Samsung Electronics Co., Ltd., Suwon-si, Gyeonggi-do (KR)

(72) Inventors: Sungho Chae, Seoul (KR); Cheol Jeong, Seongnam-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/749,665

(22) PCT Filed: Aug. 18, 2016

(86) PCT No.: PCT/KR2016/009092
§ 371 (c)(1),
(2) Date: Feb. 1, 2018

(87) PCT Pub. No.: WO2017/030386
PCT Pub. Date: Feb. 23, 2017

(65) Prior Publication Data
US 2018/0234129 A1   Aug. 16, 2018

(30) Foreign Application Priority Data
Aug. 18, 2015 (KR) .......................... 10-2015-0115865

(51) Int. Cl.
*H04B 1/7143* (2011.01)
*H04B 7/0452* (2017.01)
*H04B 7/10* (2017.01)
*H04L 5/00* (2006.01)

(52) U.S. Cl.
CPC .......... *H04B 1/7143* (2013.01); *H04B 7/0452* (2013.01); *H04B 7/10* (2013.01); *H04L 5/0048* (2013.01)

(58) Field of Classification Search
CPC .................................................... H04B 1/7143
USPC ........................................................ 375/267
See application file for complete search history.

(56) References Cited

U.S. PATENT DOCUMENTS

| | | | | |
|---|---|---|---|---|
| 7,301,924 B1* | 11/2007 | Gurbuz | ............... | H04B 7/0689 370/335 |
| 2003/0072293 A1 | 4/2003 | Fischer | | |
| 2004/0264592 A1* | 12/2004 | Sibecas | ................. | H01Q 21/24 375/267 |

(Continued)

FOREIGN PATENT DOCUMENTS

| | | |
|---|---|---|
| JP | 2001-203672 A | 7/2001 |
| KR | 10-2010-0073752 A | 7/2010 |

*Primary Examiner* — Lihong Yu
(74) *Attorney, Agent, or Firm* — Jefferson IP Law, LLP

(57) ABSTRACT

This disclosure relates to a 5G or pre-5G communication system that will be provided to support higher data rates than a 4G communication system such as LTE. According to the present invention, in a method for transmitting, by a transmitter, a signal to a receiver, a transmitter transmits information on a polarization hopping pattern to a receiver and transmits a signal to a receiver according to a hopping pattern indicated by the polarization hopping pattern information. The receiver changes the polarization of the antenna according to the hopping pattern and receives the signal.

7 Claims, 13 Drawing Sheets

(56) References Cited

U.S. PATENT DOCUMENTS

| | | |
|---|---|---|
| 2005/0075139 A1 | 4/2005 | Shapira |
| 2008/0267259 A1 | 10/2008 | Budampati et al. |
| 2009/0110114 A1 | 4/2009 | Onggosanusi et al. |
| 2010/0158078 A1 | 6/2010 | Ro et al. |
| 2010/0272152 A1 | 10/2010 | Kishiyama et al. |
| 2012/0088458 A1* | 4/2012 | Nogami ............... H04B 7/0632 455/67.11 |
| 2012/0201319 A1* | 8/2012 | Asplund ............. H04B 7/0413 375/267 |
| 2012/0236798 A1* | 9/2012 | Raaf .................... H04B 7/0452 370/328 |
| 2014/0184439 A1 | 7/2014 | Ainspan et al. |
| 2017/0033848 A1* | 2/2017 | Cordeiro ............. H04B 7/0452 |

\* cited by examiner

FIG. 10A
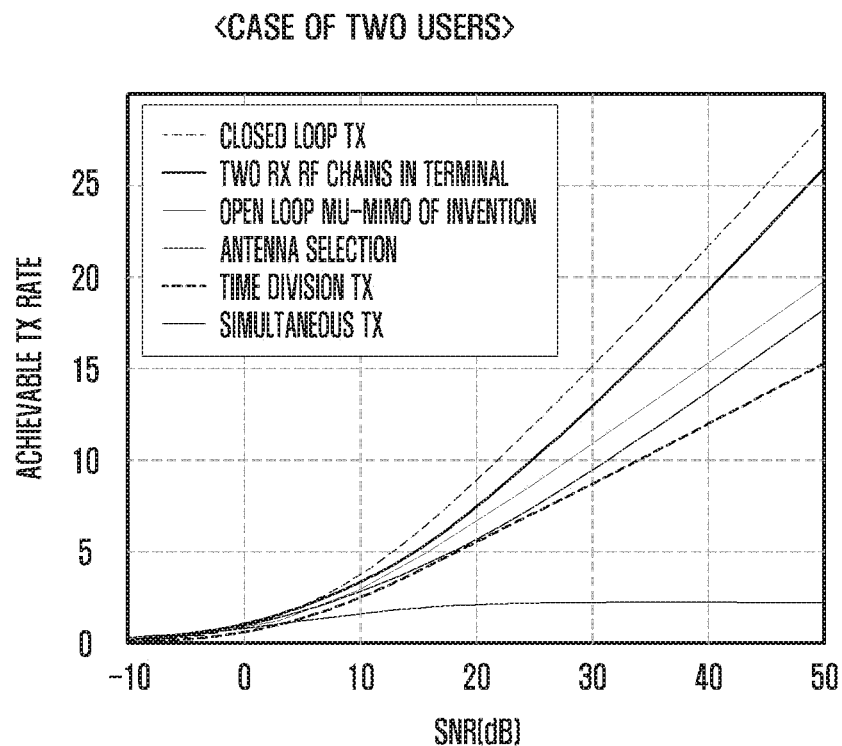
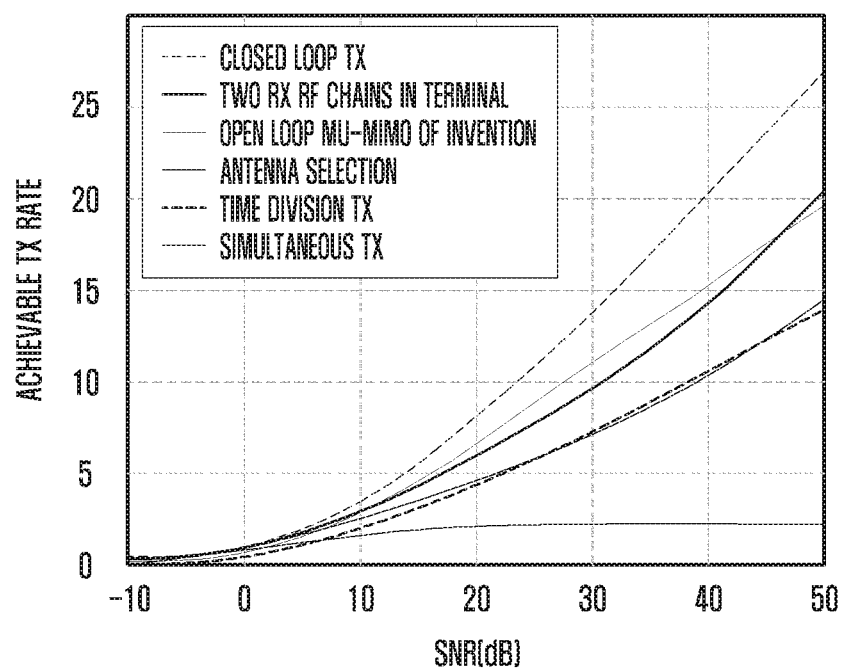

FIG. 10B
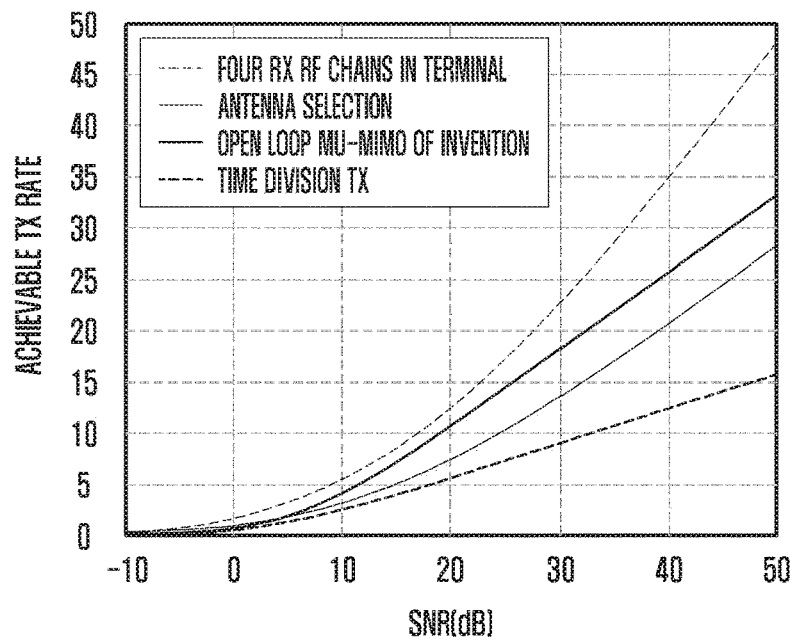
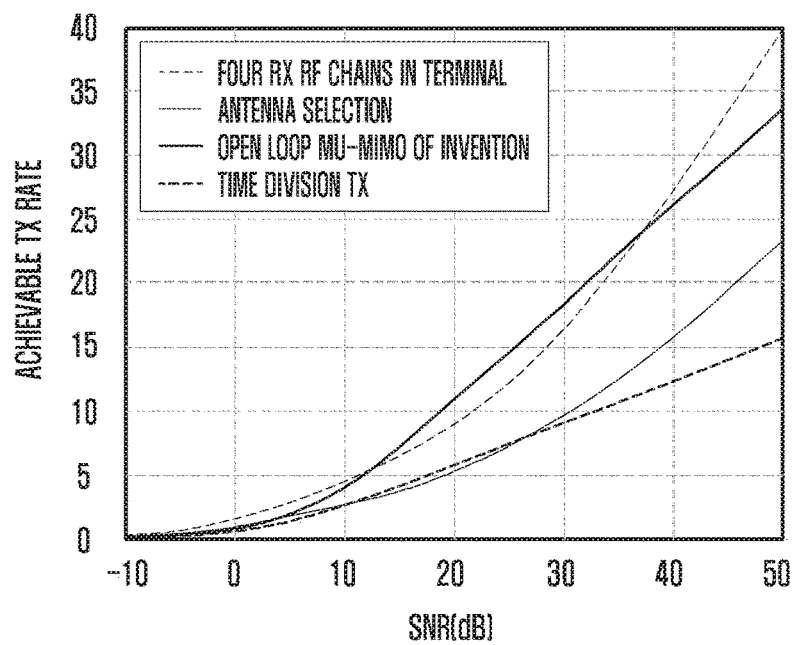

METHOD AND APPARATUS FOR TRANSMITTING AND RECEIVING SIGNALS USING OPEN-LOOP MULTI-INPUT/OUTPUT TECHNOLOGY

TECHNICAL FIELD

The present invention relates to a method and apparatus for transmitting and receiving signals by using an open loop multi-input multi-output (MIMO) technology without channel state information.

BACKGROUND ART

In order to satisfy increasing demands of radio data traffic after the commercialization of a 4G communication system, efforts at developing an advanced 5G communication system or a pre-5G communication system have been made. For this reason, the 5G communication system or the pre-5G communication system is also referred to as a beyond-4G network communication system or a post-LTE system.

In order to accomplish a higher data transfer rate, the 5G communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system.

Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like.

Besides, in the 5G communication system, a hybrid FSK and QAM modulation (FQAM) and a sliding window super-position coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

There is a growing demand for various communication services such as internet of things (IoT) in addition to the existing communication services. To meet such a demand, a scenario of providing several communication services by using frequency/space resources divided from the existing frequency/space resources is being considered. For an efficient use of limited frequency/space resources, different communication services should coexist on adjacent frequency resources. However, in this case, problems such as mutual interference and hardware issue of an analog-digital converter (ADC) or a digital-analog converter (DAC) may be caused. If a solution of such problems is not provided, the system performance of each service will be greatly degraded. In particular, when the coverage provided by the system is different, or when base stations of each system are in different locations, the above problems may become more serious.

In order to solve these problems, an open loop transmission which does not require channel state information is advantageous in comparison with a closed loop transmission. Because feedback overhead is reduced, there is an advantage that a related circuit is not used, power consumption and complexity are reduced, and signaling overhead is reduced.

Also, in case of a terminal, it is advantageous to have one radio frequency (RF) chain. A current LTE terminal has two or more reception RF chains, but having only one RF chain is advantageous in that cost can be reduced by 30%, power consumption is reduced, and baseband-related complexity is reduced.

Further, in multi-user multi-input multi-output (MU-MIMO), a transmission rate is improved and the number of users capable of simultaneous access is increased.

DISCLOSURE

Technical Problem

The present invention proposes a method for a transmitter to efficiently perform an open loop MU-MIMO transmission to a receiver having a single RF chain (which may be a terminal for example).

Technical Solution

According to the present invention for solving the above problems, a method for transmitting a signal to a receiver at a transmitter comprise steps of transmitting polarization hopping pattern information to the receiver; and transmitting a signal to the receiver according to a hopping pattern indicated by the polarization hopping pattern information, wherein the signal is decoded by the receiver.

In addition, a method for receiving a signal from a transmitter at a receiver comprises steps of receiving polarization hopping pattern information from the transmitter; receiving a signal from the transmitter according to a hopping pattern indicated by the polarization hopping pattern information; and decoding the signal.

In addition, a transmitter transmitting a signal to a receiver comprises a transceiver configured to transmit or receive a signal to or from the receiver; and a controller configured to control the transceiver to transmit polarization hopping pattern information to the receiver, and control the transceiver to transmit a signal to the receiver according to a hopping pattern indicated by the polarization hopping pattern information, wherein the signal is decoded by the receiver.

In addition, a receiver receiving a signal from a transmitter comprises a transceiver configured to transmit or receive a signal to or from the transmitter; and a controller configured to control the transceiver to receive polarization hopping pattern information from the transmitter, to control the transceiver to receive a signal from the transmitter according to a hopping pattern indicated by the polarization hopping pattern information, and to control the signal to be decoded.

Advantageous Effects

According to the method and apparatus according to embodiments of the present invention, the base station and the terminal can transmit and receive signals by using the open loop MIMO transmission method according to embodiments of the present invention.

DESCRIPTION OF DRAWINGS

FIGS. 10A and 10B are diagrams illustrating transmission performance according to the present invention.

MODE FOR INVENTION

Figure 1:
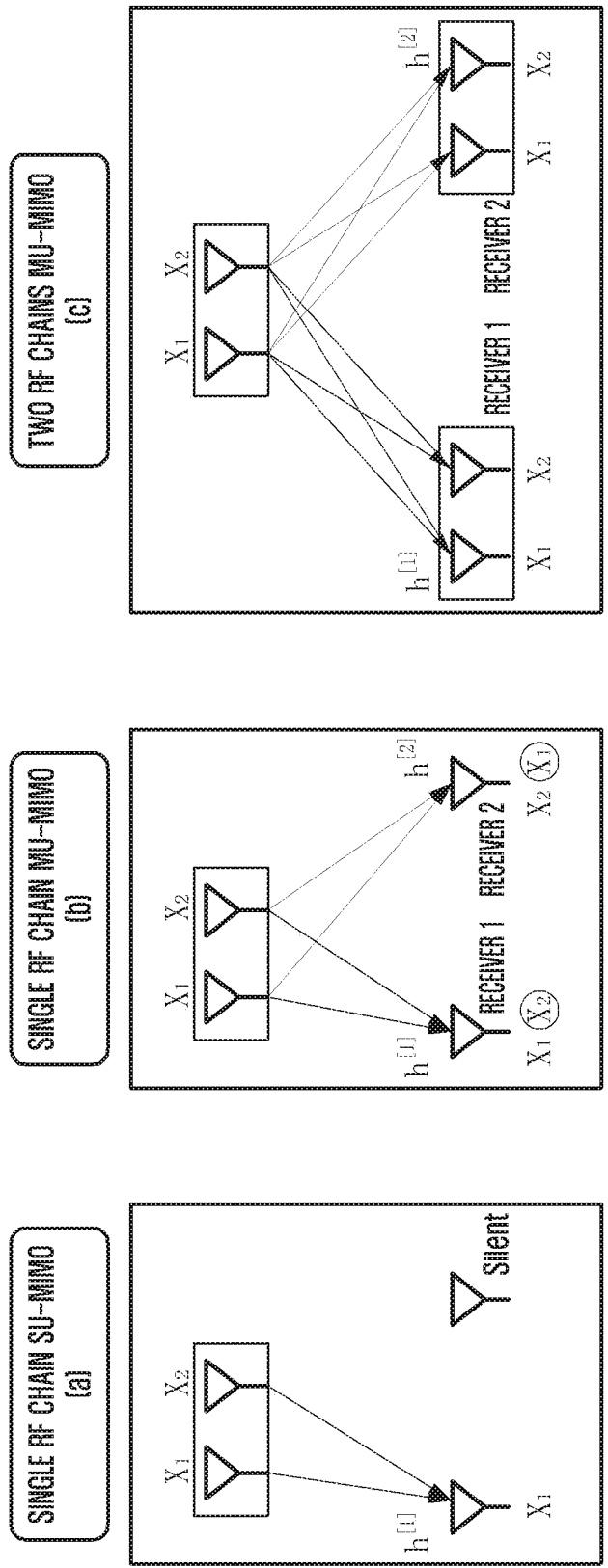
FIG. 1 is a diagram illustrating an open loop MU-MIMO transmission scheme implemented in a current cellular system.

Hereinafter, embodiments of the present invention will be described in detail with reference to the accompanying drawings. In the following description of the present invention, a detailed description of well known functions and elements will be omitted when it may make the subject matter of the present invention rather unclear. The terms used herein are defined in consideration of the functions of the present invention, and may be changed according to the intention of the user, the operator, or the like. Therefore, the definition should be based on the contents throughout this disclosure.

In addition, although embodiments of the present invention will be focused on an OFDM-based wireless communication system, especially the 3GPP E-UTRAN standard, it is apparent to a person skilled in the art that the subject matter of the present invention may be applied to other communication systems having a similar technical background and channel form without departing from the scope of the present invention.

The advantages and features of the present invention and the manner of achieving them will become apparent through embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. The present invention is only defined by the scope of claims. Like reference numerals refer to like elements throughout this disclosure.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

FIG. 1 is a diagram illustrating an open loop MU-MIMO transmission scheme implemented in a current cellular system. In FIG. 1, a transmitter may be a base station, and a receiver may be a terminal or mobile station.

Referring to FIG. 1, part (a) shows a case of single-user multi-input multi-output (SU-MIMO) using a single radio frequency (RF) chain. In this case, the receiver has one RF chain, and the transmitter has two RF chains. Two antennas of the transmitter may transmit x1 and x2 signals to one antenna of the receiver via a channel h[1] in one time slot. In this case, since a service can be provided to only one user in one time slot, the data transmission rate is low.

Part (b) shows a case of multi-user multi-input multi-output (MU-MIMO) using a single RF chain. In this case, the transmitter has two RF chains, and there are two receivers having one RF chain. Two antennas of the transmitter transmit x1 and x2 signals to an antenna of each receiver. In this case, a first receiver receives two signals transmitted by the transmitter via a channel $h^{[1]}$, and a second receiver receives two signals transmitted by the transmitter via a channel $h^{[2]}$. In this case, the signals x1 and x2 are transmitted at the same time. Therefore, if the first receiver tries to receive x1 and the second receiver tries to receive x2, the x2 signal acts as interference to the first receiver, and the x1 signal acts as interference to the second receiver. In this case, there arises a problem that it is difficult to decode the signal due to the influence of interference.

Part (c) shows a case of MU-MIMO using two RF chains. In this case, each of the transmitter and the two receivers has two RF chains. Two antennas of the transmitter transmit signals x1 and x2 to each receiver. Since each receiver has two RF chains, it is possible to simultaneously transmit two streams. However, if the receiver having two RF chains is a terminal, there arises a problem that the cost of the terminal increases.

Figure 2:
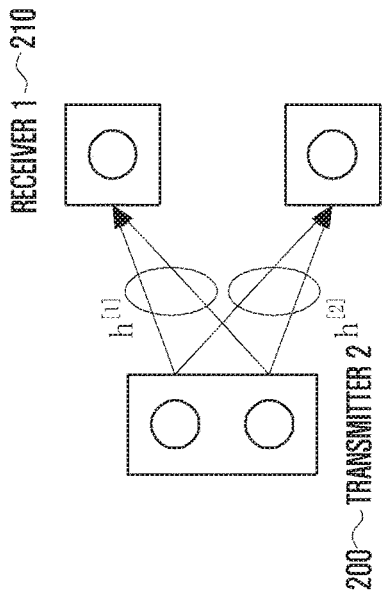
FIG. 2 is a diagram illustrating a technique for solving a problem of FIG. 1.

FIG. 2 is a diagram illustrating a technique for solving a problem of FIG. 1.

Referring to FIG. 2, it is assumed that a transmitter 200 has two RF chains, and that a first receiver 210 and a second receiver 211 have one RF chain. In this case, a signal transmitted from the transmitter to the first receiver goes through a channel $h^{[1]}$, and a signal transmitted from the transmitter to the second receiver goes through a channel $h^{[2]}$. In this case, the transmitter transmits an input signal as shown in Equation 1 below to the two receivers. Herein, $u1^{[k]}$ and $u2^{[k]}$ denote codeword symbols which are independent of each other, and k is 1 and 2 which denote the respective receiver.

$$X = \begin{bmatrix} 1 & 0 \\ 0 & 1 \\ 1 & 0 \\ 0 & 1 \\ 0 & 0 \\ 0 & 0 \end{bmatrix} \begin{bmatrix} u_1^{[1]} \\ u_2^{[1]} \end{bmatrix} + \begin{bmatrix} 1 & 0 \\ 0 & 1 \\ 1 & 0 \\ 0 & 1 \\ 0 & 0 \\ 0 & 0 \end{bmatrix} \begin{bmatrix} u_1^{[2]} \\ u_2^{[2]} \end{bmatrix} \quad \text{[Equation 1]}$$

This is to transmit four streams during three time slots. The channel state of the first receiver is changed to $h^{[1]}(1)$, $h^{[1]}(2)$, and $h^{[1]}(1)$ in time slots 1, 2, and 3, respectively, and the channel state of the second receiver is changed to $h^{[2]}(1)$, $h^{[2]}(2)$, and $h^{[2]}(2)$. In this case, a signal y received by the first receiver and the second receiver per each time slot is as Equation 2 in which z means noise.

$$\begin{bmatrix} y^{[1]}(1) \\ y^{[1]}(2) \\ y^{[1]}(3) \end{bmatrix} = \begin{bmatrix} z^{[1]}(1) \\ z^{[1]}(2) \\ z^{[1]}(3) \end{bmatrix} + \quad \text{[Equation 2]}$$

$$\begin{bmatrix} h_1^{[1]}(1) & h_2^{[1]}(1) & 0 & 0 & 0 & 0 \\ 0 & 0 & h_1^{[1]}(2) & h_2^{[1]}(2) & 0 & 0 \\ 0 & 0 & 0 & 0 & h_1^{[1]}(1) & h_2^{[1]}(1) \end{bmatrix}$$

$$\begin{bmatrix} x_1(1) \\ x_2(1) \\ x_1(2) \\ x_2(2) \\ x_1(3) \\ x_2(3) \end{bmatrix}$$

$$\begin{bmatrix} y^{[2]}(1) \\ y^{[2]}(2) \\ y^{[2]}(3) \end{bmatrix} = \begin{bmatrix} z^{[2]}(1) \\ z^{[2]}(2) \\ z^{[2]}(3) \end{bmatrix} +$$

$$\begin{bmatrix} h_1^{[2]}(1) & h_2^{[2]}(1) & 0 & 0 & 0 & 0 \\ 0 & 0 & h_1^{[2]}(2) & h_2^{[2]}(2) & 0 & 0 \\ 0 & 0 & 0 & 0 & h_1^{[2]}(1) & h_2^{[2]}(1) \end{bmatrix}$$

$$\begin{bmatrix} x_1(1) \\ x_2(1) \\ x_1(2) \\ x_2(2) \\ x_1(3) \\ x_2(3) \end{bmatrix}$$

In this case, a signal received by the first receiver is as Equation 3 below.

$$\begin{bmatrix} y^{[1]}(1) \\ y^{[1]}(2) \\ y^{[1]}(3) \end{bmatrix} = \quad \text{[Equation 3]}$$

$$\underbrace{\begin{bmatrix} h_1^{[1]}(1) & h_2^{[1]}(1) \\ h_1^{[1]}(2) & h_2^{[1]}(2) \\ 0 & 0 \end{bmatrix} \begin{bmatrix} u_1^{[1]} \\ u_2^{[1]} \end{bmatrix}}_{\text{rank}=2} + \underbrace{\begin{bmatrix} h_1^{[1]}(1) & h_2^{[1]}(1) \\ 0 & 0 \\ h_1^{[1]}(1) & h_2^{[1]}(1) \end{bmatrix} \begin{bmatrix} u_1^{[2]} \\ u_2^{[2]} \end{bmatrix}}_{\text{rank}=1} +$$

$$\begin{bmatrix} z^{[1]}(1) \\ z^{[1]}(2) \\ z^{[1]}(3) \end{bmatrix} = \begin{bmatrix} h_1^{[1]}(1) & h_2^{[1]}(1) \\ h_1^{[1]}(2) & h_2^{[1]}(2) \\ 0 & 0 \end{bmatrix} \begin{bmatrix} u_1^{[1]} \\ u_2^{[1]} \end{bmatrix} +$$

$$\begin{bmatrix} 1 \\ 0 \\ 1 \end{bmatrix} (h_1^{[1]}(1)u_1^{[2]} + h_2^{[1]}(1)u_2^{[2]}) + \begin{bmatrix} z^{[1]}(1) \\ z^{[1]}(2) \\ z^{[1]}(3) \end{bmatrix}$$

In view of the first receiver, the interference caused by a signal of the second receiver is one-dimensional, and a desired signal with two degrees of freedom (DOF) has two independent dimensions. Since the second receiver has also two DOFs, 4/3 DOF is obtained when considering all receivers. When a plurality of streams are transmitted to a receiver in a predetermined pattern as shown in FIG. 2, the receiver has an advantage of easily removing interference without feedback of channel state information.

Figure 3:
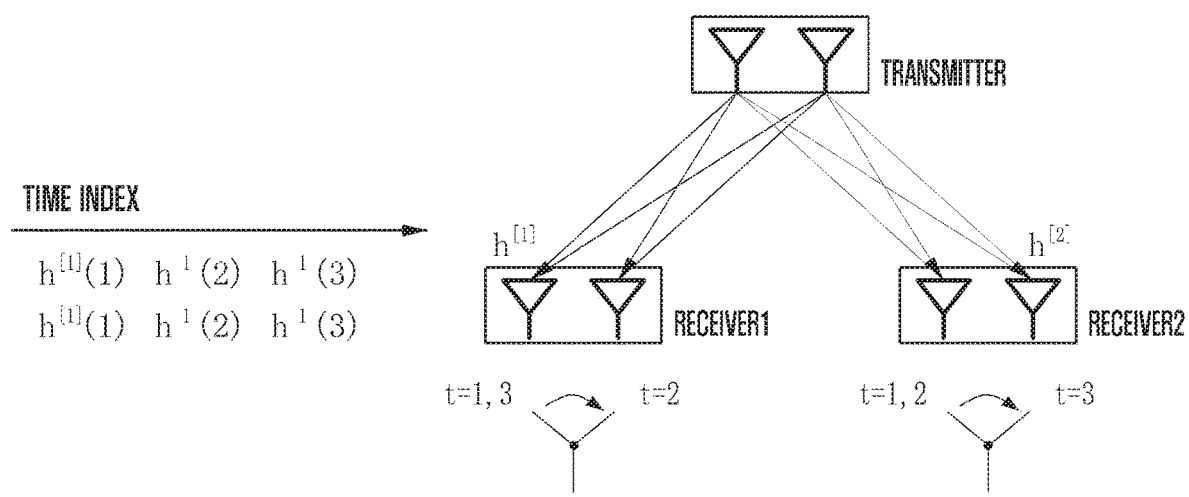
FIG. 3 is a diagram illustrating an antenna selection scheme for performing a method of FIG. 2.

FIG. 3 is a diagram illustrating an antenna selection scheme for performing a method of FIG. 2.

Referring to FIG. 3, in order to perform the method of FIG. 2, the transmitter and the receiver should differ in channel state per time slot. For different channels between the transmitter and the receiver, the receiver may have two antennas (and RF chains) and use different antennas depending on the time slot. This may be performed through antenna switching or antenna selection. Specifically, in order to perform the method of FIG. 2, the first receiver 210 may use a first antenna 300 in time slots 1 and 3, and use a second antenna 301 in a time slot 2. The second receiver 211 may use a first antenna 310 in time slots 1 and 2, and use a second antenna 311 in a time slot 3.

However, when this method is used, the receiver requires two RF chains and corresponding antennas, thus causing an increase in cost. In addition, a space for installing an additional antenna is needed, and transmission/reception performance is lowered because the correlation between channels increases as the line-of-sight component increases.

Figure 4:
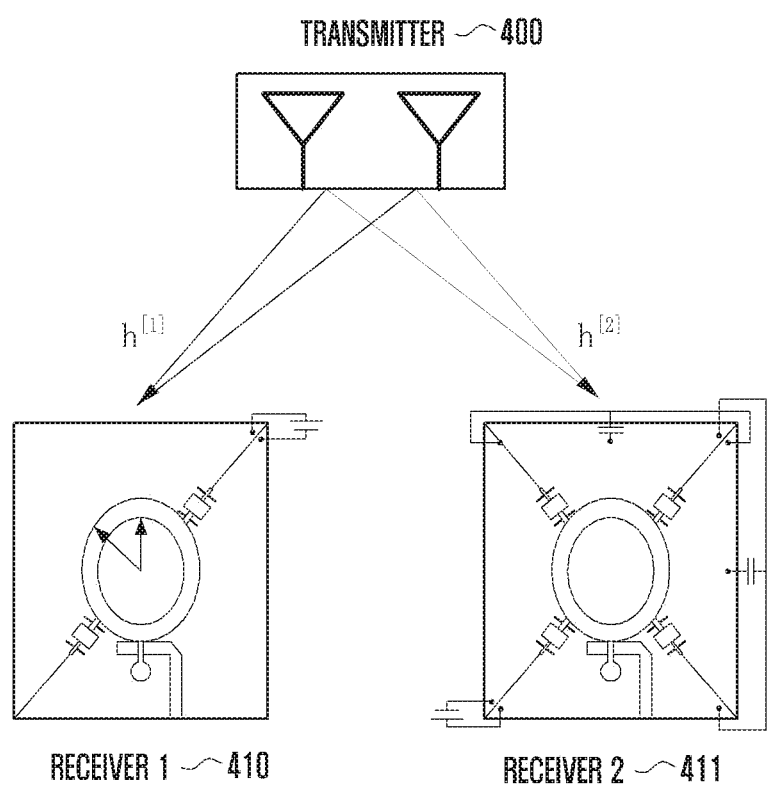
FIG. 4 is a diagram illustrating the configuration of the present invention for solving such a problem.

FIG. 4 is a diagram illustrating the configuration of the present invention for solving such a problem.

Referring to FIG. 4, a transmitter 400 performs MU-MIMO transmission to a first receiver 410 and a second receiver 420, and each receiver may arrange interference by appropriately changing a polarization direction of a reception antenna through a switch or the like. At this time, a polarization change pattern may be shared between the transmitter and the receiver before the MU-MIMO transmission, and the receiver may increase a signal transmission rate through a method for appropriately determining the coefficients of an attenuator and a phase shifter. The attenuator reduces a signal size by using a resistor, etc., and the phase shifter is a device for shifting the phase of a signal by adjusting the length of a transmission line or the like.

This scheme of FIG. 4 may reduce the size of an antenna (in case of a 6-polarized antenna) to one sixth of that of a uni-polarized antenna used in FIG. 3. Because co-polarization and cross-polarization channels are always different even if an interval between the antennas is small or the line-of-sight value is large, there is an advantage that the correlation value of each channel is very low.

Figure 5:
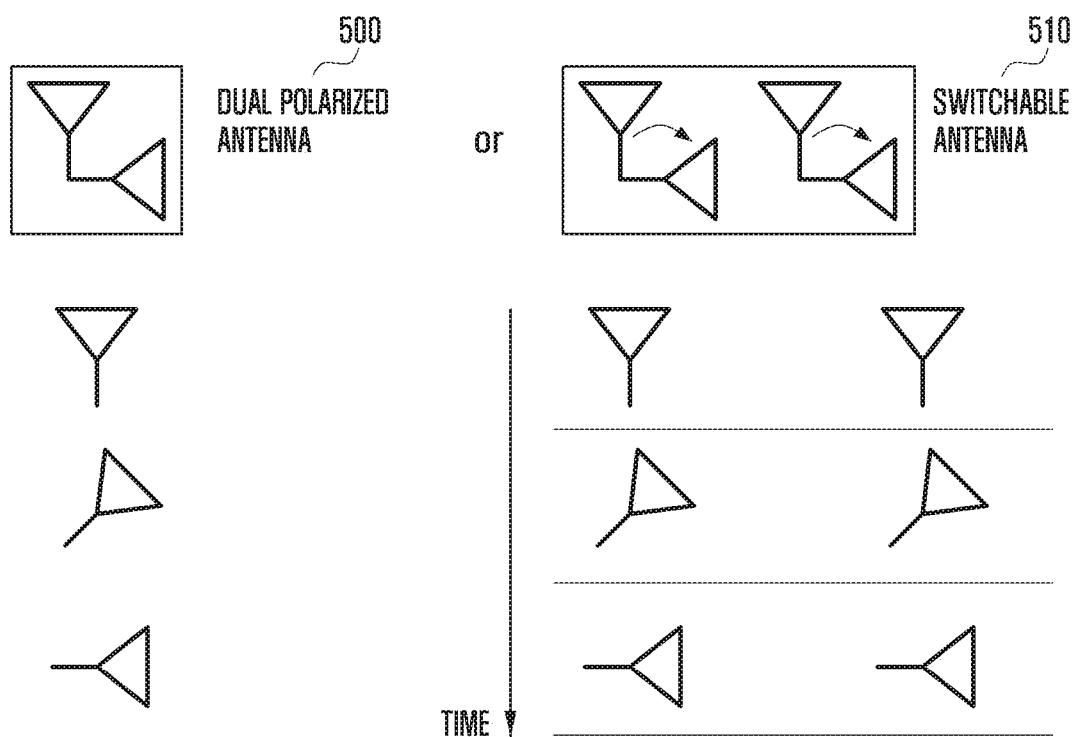
FIG. 5 is a diagram illustrating the structure of a transmitter for performing the present invention.

FIG. 5 is a diagram illustrating the structure of a transmitter for performing the present invention.

Referring to FIG. 5, the transmitter may arbitrarily determine a polarization direction, or may have a fixed polarization direction. If the transmitter can determine the polarization direction, the transmitter may include a dual polarized antenna 500 or a switchable antenna 510. In this case, the transmitter may use a vertical/horizontal dipole antenna through switching.

The transmitter first receives polarization related information from the receiver, determines the number of users to participate in the open loop MU-MIMO, and transmits information on a polarization hopping pattern to each terminal. If the cross-polar discrimination (XPD) of channel is already known, the transmitter may jointly optimize the transmission/reception polarization directions in consideration of the polarization direction and the XPD of the receiver. If the transmitter does not know the XPD, the transmitter selects, for transmission, the direction with the largest channel variation.

The polarized antenna required for performing the present invention may be implemented by various methods, especially a linear polarization scheme and a circular polarization scheme. The linear polarization scheme may be realized using a dual-polarized antenna (two orthogonal electric dipoles), a tri-polarized antenna (three orthogonal electric dipoles), an up to six-polarized antenna (three orthogonal electric dipoles plus three orthogonal magnetic dipoles), and the like. This scheme may obtain a higher transmission rate as the number of antennas increases, but there is a disadvantage that signaling overhead and implementation complexity are increased. The circular polarization scheme may be realized through a left-hand circular polarization (LHCP) or a right-hand circular polarization (RHCP). Further, it is possible to implement a combination of the linear polarization scheme and the circular polarization scheme.

In the receiver, considered are a case where the receiver utilizes only the switch for changing the polarization of the antenna and a case where the switch and the combiner are utilized together. The combiner is a device that adds or subtracts two or more signals.

Figure 6:
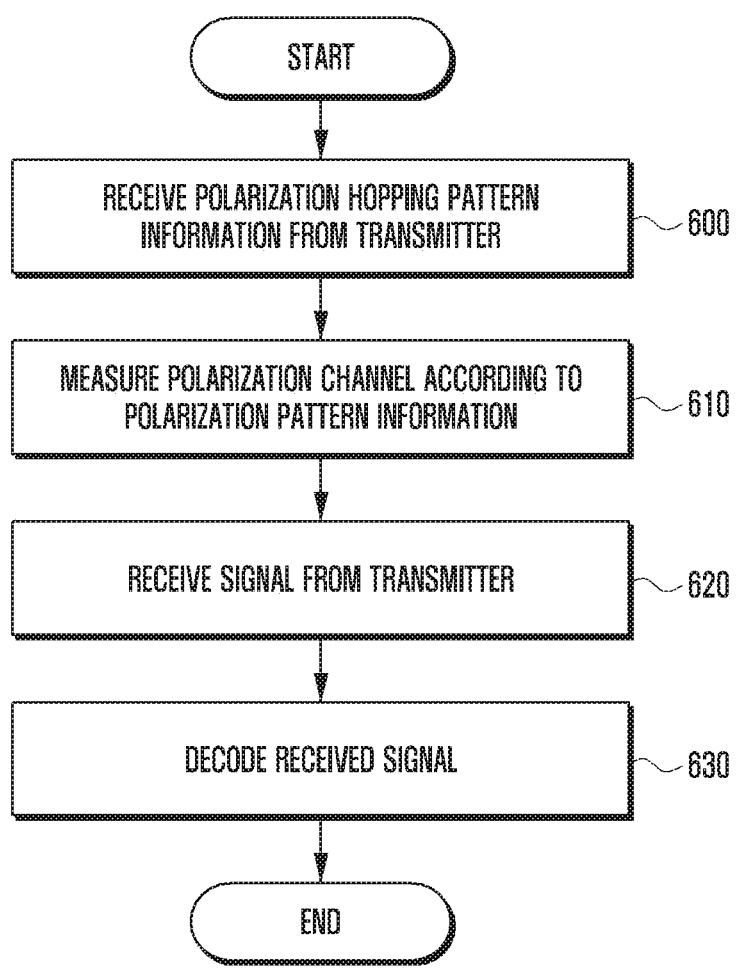
FIG. 6 is a block diagram illustrating the operation of a receiver when the receiver utilizes only a polarization switch.

FIG. 6 is a block diagram illustrating the operation of a receiver when the receiver utilizes only a polarization switch.

Referring to FIG. 6, the receiver receives polarization hopping pattern information from the transmitter at step 600. This step may not be performed when a polarization pattern is predetermined. The receiver measures a channel according to the determined polarization pattern at step 610. This step may be performed together with receiving signals from the transmitter. While applying the polarization pattern, the receiver receives a signal from the transmitter at step 620. This signal may include data, a pilot signal, control information, and the like. The receiver decodes the received signal at step 630. At this time, the receiver may change the polarization channel in the vertical/horizontal directions by using the switch. This method is applicable even when the receiver uses a plurality of polarimetric antennas.

The attenuator, the phase shifter, and the combiner may be included in both the transmitter and the receiver, and may be used together or independently as needed. For example, in case of combining a plurality of signals by subtracting or adding the signals, only the combiner is used. However, in case of reducing a signal size or shifting a signal phase and then combining the signals, the attenuator and the phase shifter are used.

Figure 7:
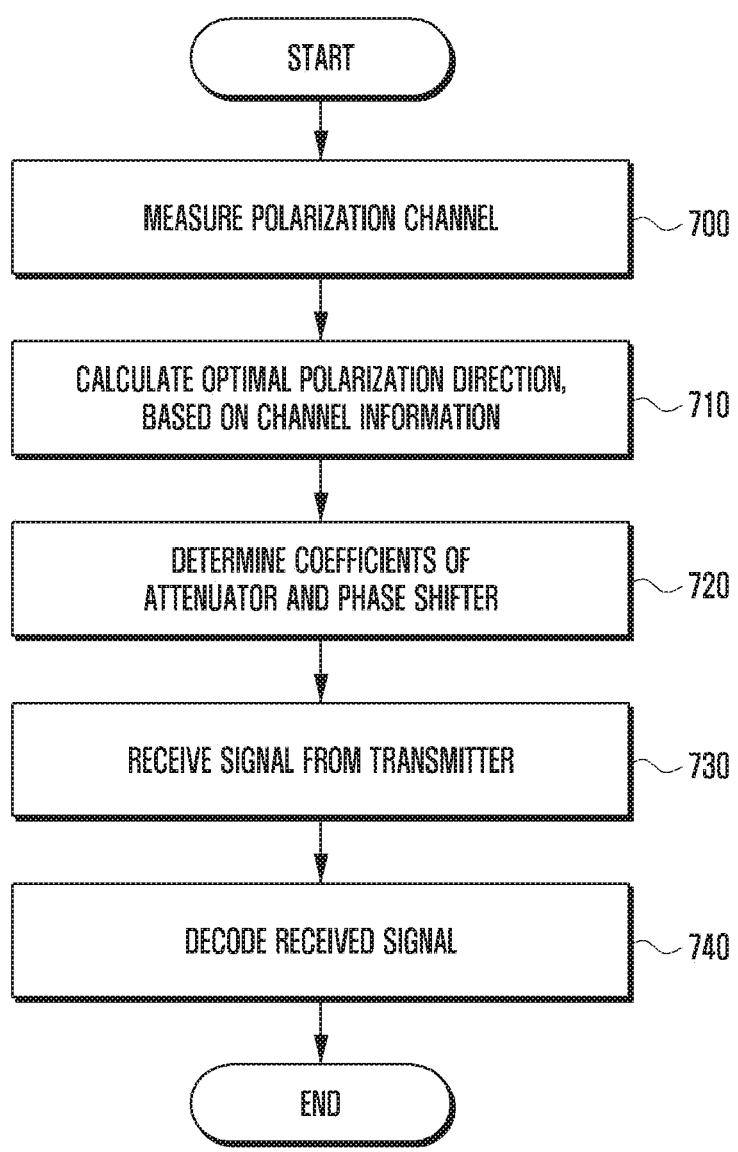
FIG. 7 is a block diagram illustrating the operation of a receiver when a transmitter and the receiver can transmit and receive signals in any polarization direction by using both a switch and a combiner.

FIG. 7 is a block diagram illustrating the operation of a receiver when a transmitter and the receiver can transmit and receive signals in any polarization direction by using both a switch and a combiner.

Referring to FIG. 7, the receiver measures a polarization channel in the vertical/horizontal directions at step 700. The receiver determines an optimal polarization direction at step 710, based on the measured channel state information. The optimal polarization direction is a case where $\max(h_{11}(1)h^*_{12}(2) - h_{12}(1)h^*_{11}(2))$ is achieved. The receiver determines the coefficients of the attenuator and the phase shifter at step 720. The determination of the coefficient complies with one of the following methods.

The coefficients are determined by the size of a channel and the degree of channel variation.

In the first determination method, when the initially measured channel is $h_{11}(1), h_{12}(1)$, the best $h_{11}(2), h_{12}(2)$ may be obtained on the basis of this.

Both channels may be changed without leaving the initially measured channel intact. In other words, $h_{11}(1)$, $h_{12}(1)$ as well may be changed to a desired value.

A channel phase only may be changed without changing a channel size. In this case, the attenuator is not used.

While applying the determined polarization pattern, the receiver receives a signal from the transmitter at step 730. The signal may include data, a pilot signal, control information, and the like. The receiver decodes the received signal at step 740. This method is applicable even when the receiver uses a plurality of polarimetric antennas.

In addition, a method for the transmitter (base station) to select the receiver (terminal) to transmit a signal in the open loop MU-MIMO transmission scheme of the present invention may consider the type of signal to be transmitted, as follows.

When the transmitter transmits positive/negative reception acknowledgment information (ACK/NACK) through downlink, the receiver may inform, at the transmission of uplink, the base station that the receiver will receive the ACK/NACK for the uplink in the open loop MU-MIMO scheme of the present invention. Alternatively, the receiver may always receive the ACK/NACK for the uplink in the open loop MU-MIMO scheme of the present invention by previously setting system information or the like.

When the transmitter transmits data through downlink, the transmitter may group receivers depending on whether the receiver has a polarization function, and transmit a signal in the open loop MU-MIMO scheme arbitrarily in the group. Additionally, the transmitter may perform grouping depending on a channel quality indicator (CQI) or a coverage class.

Also, in case of controlling inter-cell interference (ICI), it is possible to transmit a signal in the open loop MU-MIMO scheme of the present invention by pairing terminals located at edges of each cell. This method will be described in detail below with reference to FIG. 9.

Figure 8:
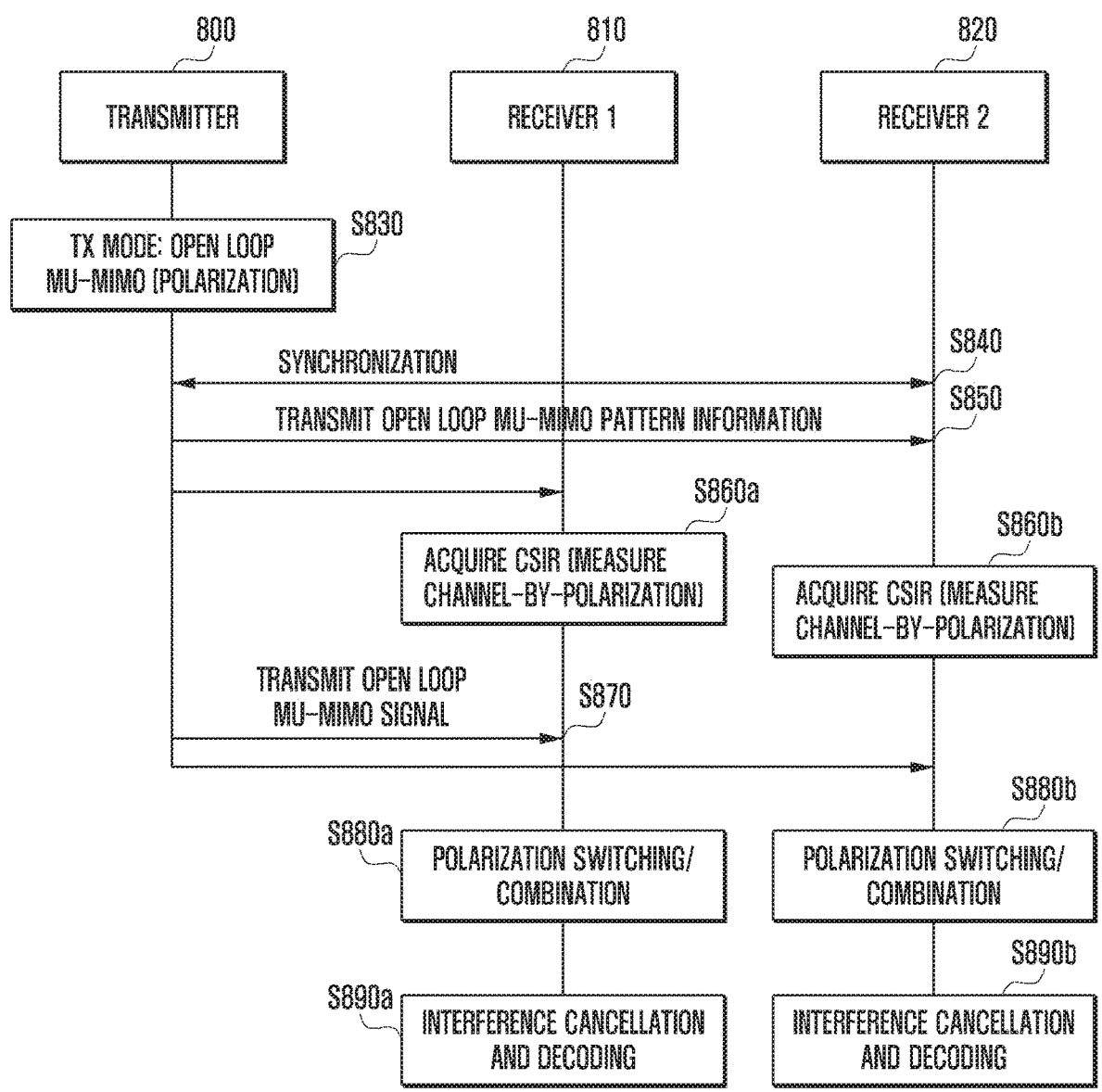
FIG. 8 is a diagram illustrating control signaling between a transmitter and a receiver to perform the present invention.

FIG. 8 is a diagram illustrating control signaling between a transmitter and a receiver to perform the present invention.

Referring to FIG. 8, a transmitter 800 sets a transmission mode of open loop MU-MIMO at step S830. In this case, the transmission mode may be what using polarization. The transmitter performs synchronization with a first receiver 810 and a second receiver 820 at step S840.

Although not shown, the receiver may transmit, to the transmitter, information related to the polarization that an antenna of the receiver can support. The polarization related information may include a horizontal component, a vertical component, a right-hand circular polarization (RHCP), a left-hand circular polarization (LHCP), and the like, which are information necessary for the transmitter to perform the open loop MU-MIMO transmission by using polarization. If the polarization related information includes information about the number of elements of the antenna and the separation of the antennas, the transceiver may use the number and type of polarization in performing the open loop MU-MIMO transmission according to the present invention, the XPD of the polarimetric antenna, and a plurality of polarimetric antennas.

Although not shown, the transmitter determines, based on the polarization related information received from the receiver, how many receivers to transmit signals to, by using the open loop MU-MIMO transmission scheme, and may transmit related information to the receiver through signaling which is an open loop MU-MIMO mode notification. The open loop MU-MIMO mode notification may include information about how many receivers and which receivers are to be provided with a service in the open loop MU-MIMO transmission scheme.

These two steps may be performed after synchronization.

At step S850, the transmitter transmits the polarization hopping pattern information to each receiver after the open loop MU-MIMO notification. At this time, the transmitter may notify a predefined hopping pattern number to the receiver or the content of a hopping pattern, and if the polarization of the base station can be changed, may also inform related information. Then, the transmitter transmits a pilot signal so that the receiver can measure a polarization channel in each direction. The receiver receives the pilot signal and acquires channel state information at the receiver by measuring channel-by-polarization at steps S860a and S860b.

The transmitter transmits a signal to each receiver in the open loop MU-MIMO transmission scheme according to a predetermined pattern at step S870. Each receiver determines polarization switching and combination at steps S880a and S880b, and performs interference cancellation and signal decoding at steps S890a and S890b.

Figure 9:
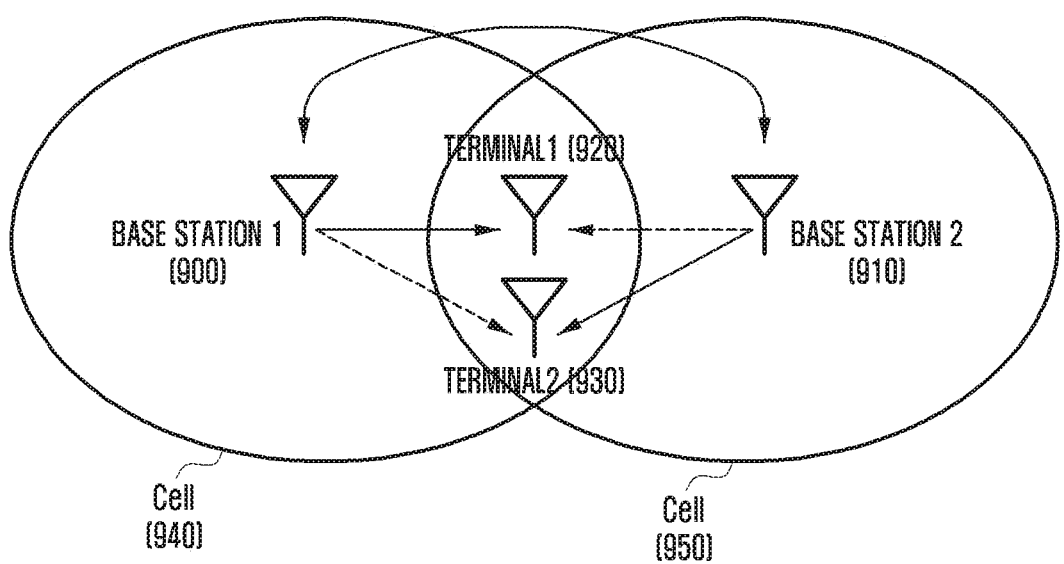
FIG. 9 is a diagram illustrating an example in which the present invention is applied to interference cancellation at a cell edge.

FIG. 9 is a diagram illustrating an example in which the present invention is applied to interference cancellation at a cell edge.

Referring to FIG. 9, the technical feature of the present invention has an advantage of being able to process interference without channel information feedback in a situation, such as a cell edge or a device-to-device (D2D) communication, where considerable interference is caused. For example, if both of a first base station 900 and a second base station 910 are capable of the open loop MU-MIMO transmission, the first base station transmits a notification of being going to perform the open loop MU-MIMO transmission to the second base station (the opposite is also possible), and the first and second base stations perform synchronization. The first and second base stations perform the open loop MU-MIMO transmission to first and second terminals 920 and 930 located at the edge of a first cell 940, in which the first base station performs a service, and at the edge of a second cell 950 in which the second base station performs a service. The first and second terminals perform polarization switch and combination according to a predetermined hopping pattern and receive signals from the first and second base stations.

FIGS. 10A and 10B are diagrams illustrating transmission performance according to the present invention.

Referring to FIG. 10A, the transmission performance according to the present invention is shown when the number of receivers (users) is two and when the line-of-sight components are small and large. In case of a closed loop, it is assumed that the receiver knows channel state information. This case and a case where there are two reception RF chains in the receiver may be regarded as the upper bound of the proposed technique. It can be seen that the present invention always has better performance than the antenna selection scheme which is a typical open loop technique. Particularly, in case of the antenna selection scheme, as the line-of-sight component becomes larger, the channel correlation becomes higher and the performance deteriorates significantly. According to the present invention, it can be seen that even though the line-of-sight value is large, good performance can be obtained because two polarization channels are always different. Also, as can be seen from FIG. 10B in which there are four receivers, such a performance gain becomes larger as the number of receivers (users) increases.

Figure 11:
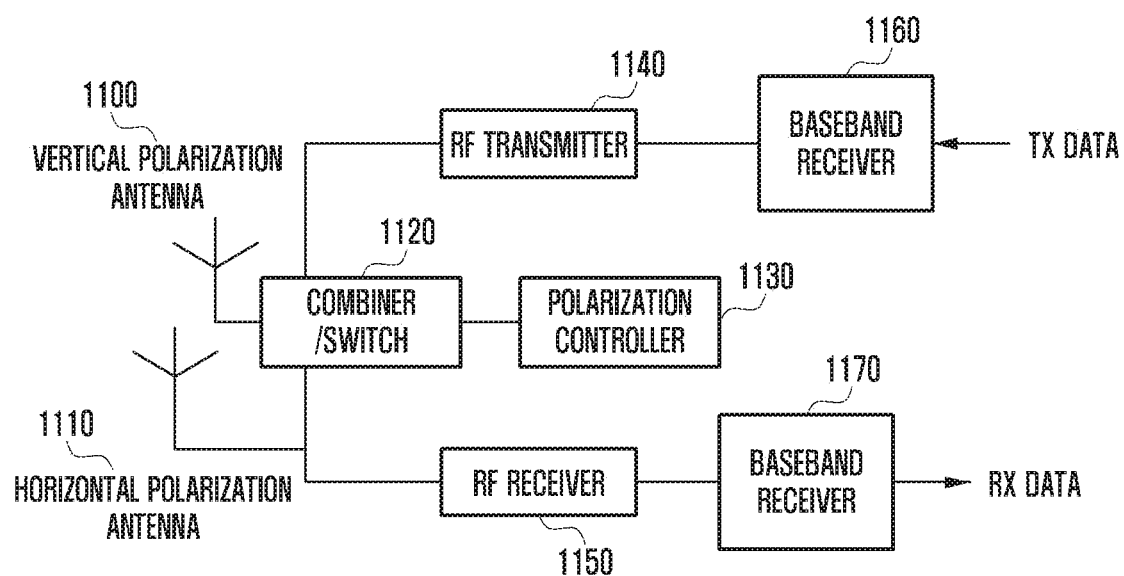
FIG. 11 is a block diagram illustrating an apparatus for performing the present invention.

FIG. 11 is a block diagram illustrating an apparatus for performing the present invention.

Referring to FIG. 11, the transmitter or receiver includes two antennas (a horizontal polarization antenna 1110, a vertical polarization antenna 1100). These two antennas are connected to a combiner/switch 1120, which is controlled by a polarization controller 1130. The combiner/switch 1120 is connected to an RF transmitter 1140 and a baseband transmitter 1160, and also connected to an RF receiver 1150 and a baseband receiver 1170.

Figure 12:
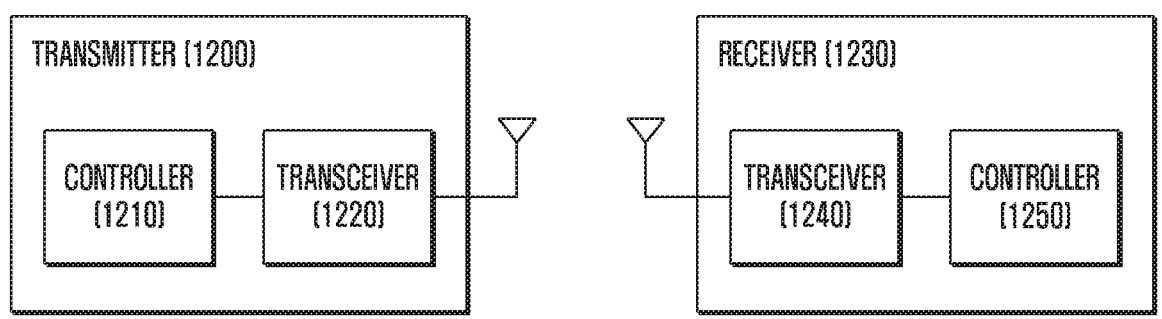
FIG. 12 is a block diagram illustrating another apparatus capable of performing the present invention.

FIG. 12 is a block diagram illustrating another apparatus capable of performing the present invention.

Referring to FIG. 12, a transmitter 1200 may include a controller 1210 and a transceiver 1220. The transceiver includes a plurality of antennas and RF chains, and the plurality of antennas may arbitrarily determine a polarization direction or may have a fixed polarization direction. The controller controls the transceiver to receive polarization related information from a receiver 1230, to transmit an open loop MU-MIMO mode notification to the receiver, to transmit a polarization hopping pattern information to the receiver, to transmit a pilot signal so as for the receiver to know a polarization channel state, and to transmit a signal in accordance with a determined pattern.

The receiver 1230 may include a controller 1250 and a transceiver 1240. The transceiver includes an antenna, which is capable of polarization switching and combination, and an RF chain, and may also include at least one of a switch, a combiner, an attenuator, and a phase shifter so as to change a polarization channel. The controller controls the transceiver to transmit the polarization related information to the transmitter, to receive the open loop MU-MIMO mode notification and the polarization hopping pattern information from the transmitter, to receive the pilot signal from the transmitter, and to receive the signal transmitted by the transmitter according to the determined pattern. Additionally, the controller acquires channel state information, based on the received pilot signal, and switches or combines the antennas according to the determined pattern. When a signal is received according to the determined pattern, the controller eliminates interference according to a predetermined method and decodes the signal.

According to the present invention, the transmitter (base station) can perform signal transmission using the MU-MIMO transmission scheme even when any channel state information (channel size and phase) is not received from the receiver (terminal). For example, the transmitter may always transmit a signal with the lowest modulation and coding scheme (MCS) through an agreement with the terminal, or if the MCS used for uplink transmission is used as it is, may transmit a signal by using the MU-MIMO transmission scheme. This transmission scheme is applicable to ACK/NACK transmission for uplink transmission or signal transmission for an application, such as paging or alarm, which requires a low data transmission rate. Although it is assumed that the transmitter is the base station and the receiver is the terminal, the signal transmission can be performed according to the present invention even if the transmitter is the terminal and the receiver is the base station.

Those skilled in the art will understand that the present invention may be embodied in other specific forms without departing from the essential features thereof. It is therefore to be understood that the above-described embodiments are illustrative in all aspects and not restrictive. The scope of the present invention is defined by the appended claims rather than by the foregoing description, and all changes or modifications derived from the meaning and scope of the claims and the equivalents thereof are included in the scope of the present invention.

In the above embodiments, all the steps and messages may be subject to selective execution or may be omitted. Also, the steps in each embodiment need not occur in order and may be reversed. Similarly, the message delivery does not necessarily happen in order and may be reversed. The respective steps and message deliveries can be performed independently.

Some or all of contents described in the above embodiments are for the sake of understanding of the present invention. Therefore, the details may be regarded as exemplarily representing the method and apparatus proposed by the present invention. That is, it may be desirable to semantically, rather than syntactically, approach the contents of the embodiments.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

The invention claimed is:

1. A method for transmitting a signal to a receiver at a transmitter, the method comprising:
   receiving, from a plurality of receivers, polarization related information including at least one of information on a number of elements of the at least one antenna of each of the plurality of receivers, or information on separation of the at least one antenna;
   identifying at least one receiver from the plurality of receivers to participate in an open loop multiple-input multiple output (MIMO) transmission based on the polarization related information received from each of the plurality of receivers;
   transmitting a notification indicating each receiver identified to participate in the open loop MIMO transmission;
   transmitting, to each receiver identified to participate in the open loop MIMO transmission, polarization hopping pattern information, wherein the polarization hopping pattern information includes an indicator indicating one of a plurality of predefined hopping patterns for at least one polarization direction of at least one antenna of the transmitter; and
   transmitting, to each receiver identified to participate in the open loop MIMO transmission, the signal based on the polarization hopping pattern information.

2. The method of claim 1, further comprising transmitting, to each receiver identified to participate in the open loop MIMO transmission, a pilot signal,
   wherein the pilot signal is included in the signal or the pilot signal is transmitted separate from the signal.

3. A method for receiving a signal from a transmitter at a receiver, the method comprising:
   transmitting, to the transmitter, polarization related information of the receiver, the polarization related information including at least one of information on a number of elements of at least one antenna of the receiver, or information on separation of the at least one antenna;
   receiving, from the transmitter, a notification indicating that the receiver is to participate in an open loop multiple-input multiple output (MIMO) transmission based on the polarization related information of the receiver;
   receiving, from the transmitter, polarization hopping pattern information, wherein the polarization hopping pattern information includes an indicator indicating one of a plurality of predefined hopping patterns for at least one polarization direction of at least one antenna of the transmitter;
   receiving, from the transmitter, the signal based on the polarization hopping pattern information; and
   decoding the signal.

4. The method of claim 3, further comprising:
   receiving, from the transmitter, a pilot signal,
   wherein the pilot signal is included in the signal or the pilot signal is transmitted separate from the signal.

5. A transmitter transmitting a signal to a receiver, the transmitter comprising:
   a transceiver configured to transmit or receive one or more signals; and
   at least one processor configured to:
   receive, via the transceiver, polarization related information from a plurality of receivers, the polarization related information including at least one of information on a number of elements of the at least one antenna of each of the plurality of receivers, or information on separation of the at least one of antenna, identify at least one receiver from the plurality of receivers to participate in an open loop multiple-input multiple output (MIMO) transmission based on the received polarization related information received from each of the plurality of receivers, control the transceiver to transmit a notification indicating each receiver identified to participate in the open loop MIMO transmission, control the transceiver to transmit, to each receiver identified to participate in the open loop MIMO transmission, polarization hopping pattern information, wherein the polarization hopping pattern information includes an indicator indicating one of a plurality of predefined hopping patterns for at least one polarization direction of at least one antenna of the transmitter, and control the transceiver to transmit, to each receiver identified to participate in the open loop MIMO transmission, the signal based on the polarization hopping pattern information.

6. The transmitter of claim 5, wherein the at least one processor is further configured to:

transmit, to each receiver identified to participate in the open loop MIMO transmission, a pilot signal, wherein the pilot signal is included with the signal or the pilot signal is transmitted separate from the signal.

7. A receiver receiving a signal from a transmitter, the receiver comprising:

a transceiver configured to transmit or receive one or more signals; and at least one processor configured to:

control the transceiver to transmit, to the transmitter, polarization related information of the receiver, the polarization related information including at least one of information on a number of elements of at least one antenna of the receiver, or information on separation of the at least one antenna, receive, from the transmitter via the transceiver, a notification indicating that the receiver is to participate in an open loop multiple-input multiple output (MIMO) transmission based on the polarization related information of the receiver, receive, from the transmitter via the transceiver, polarization hopping pattern information, wherein the polarization hopping pattern information includes an indicator indicating one of a plurality of predefined hopping patterns for at least one polarization direction of at least one antenna of the transmitter, receive, from the transmitter via the transceiver, the signal based on the polarization hopping pattern information, and decode the signal.

* * * * *